(12) United States Patent
Sakakida et al.

(10) Patent No.: US 7,381,486 B2
(45) Date of Patent: Jun. 3, 2008

(54) FUEL CELL SYSTEM

(75) Inventors: Akihiro Sakakida, Yokosuka (JP) JPX;
Tsutomu Yamazaki, Yokosuka (JP) JPX; Akihiro Asai, Yokosuka (JP);
Masahiro Toriumi, Kawasaki (JP)

(73) Assignee: Nissan Motor Co., Ltd., Kanagawa (JP)

( * ) Notice: Subject to any disclaimer, the term of this patent is extended or adjusted under 35 U.S.C. 154(b) by 336 days.

(21) Appl. No.: 10/893,868

(22) Filed: Jul. 20, 2004

(65) Prior Publication Data

US 2005/0026013 A1 Feb. 3, 2005

(30) Foreign Application Priority Data

Jul. 28, 2003 (JP) ............................. 2003-202488

(51) Int. Cl.
*H01M 8/00* (2006.01)
(52) U.S. Cl. ............................. 429/12; 429/13; 429/20; 429/24; 428/99; 165/138
(58) Field of Classification Search ................... 429/12, 429/13, 20, 24; 428/99; 165/138, 38
See application file for complete search history.

(56) References Cited

U.S. PATENT DOCUMENTS

2002/0177022 A1* 11/2002 Shimonosono et al. ....... 429/24
2003/0162063 A1* 8/2003 Yoshizawa et al. ........... 429/24

FOREIGN PATENT DOCUMENTS

| EP | 1 265 304 A2 | 12/2002 |
| JP | 408263148 A * | 10/1996 |
| JP | 2002-352835 | 12/2002 |
| WO | WO 03/073547 A2 | 9/2003 |

* cited by examiner

*Primary Examiner*—Jane Rhee
(74) *Attorney, Agent, or Firm*—McDermott Will & Emery LLP

(57) ABSTRACT

Disclosed is a fuel cell system provided with a fuel cell (1), a water tank (2) which stores water to be supplied to the fuel cell, and a heating device (10) which defrosts the water inside the tank during activation of the fuel cell. The fuel cell system has a switch (19) which signals activation of the fuel cell; at least one temperature sensor (13, 14) which detects a temperature inside the water tank; a pump (3) which conveys water from the water tank to the fuel cell; a heater (12) which warms the pump; and a controller (15). The controller (15) is programmed to read a start temperature from said at least one temperature sensor (13, 14) upon reception of a signal from the switch (19); calculate on the basis of the read start temperature a first warm-up period (tw) required for the water inside the water tank (2) to reach a predetermined temperature (Tw) greater than zero degrees centigrade; calculate on the basis of the read start temperature a second warm-up period (tH) required to defrost ice inside the pump (3) using the heater; set a start time (t2) for warm-up of the pump (3) using the heater on the basis of a difference (Dt) between the first warm-up period (tw) and the second warm-up period (tH); and control the heater to begin generating heat at the start time (t2) for warm-up of the pump (3).

10 Claims, 8 Drawing Sheets

FUEL CELL SYSTEM

TECHNICAL FIELD OF THE INVENTION

This invention relates to a fuel cell system which can be activated below freezing point with low power consumption.

BACKGROUND OF THE INVENTION

A fuel cell cooling device disclosed in Tokkai 2002-352835, published by the Japan Patent Office in 2002, controls the amount of water conveyed by a conveying pump and the amount of heat generated by a heater for preventing the freezing of cooling water on the basis of the temperature of the cooling water in the fuel cell and the differential pressure of the cooling water. The fuel cell cooling device comprises a water temperature sensor which detects the temperature of the cooling water and a differential pressure gauge which detects the differential pressure between the cooling water inlet and outlet of a fuel cell stack.

SUMMARY OF THE INVENTION

In this prior art, however, the pump is located inside a pure water tank, and hence the size of the pure water tank increases, leading to a reduction in design freedom. Moreover, the heater operates constantly within the pump in order to prevent freezing, and hence power consumption increases.

An object of this invention is to provide a fuel cell system comprising a small pure water tank, in which only a small amount of power is required to start up the fuel cell.

In order to achieve the above object, this invention provides a fuel cell system provided with a fuel cell which performs power generation using hydrogen and oxygen, a water tank which stores water to be supplied to the fuel cell, and a heating device which defrosts the water inside the tank during activation of the fuel cell. The fuel cell system comprises a switch which signals activation of the fuel cell; at least one temperature sensor which detects a temperature inside the water tank; a pump which conveys water from the water tank to the fuel cell; a heater which warms the pump; and a controller. The controller is programmed to read a start temperature from said at least one temperature sensor upon reception of a signal from the switch; calculate on the basis of the read start temperature a first warm-up period required for the water inside the water tank to reach a predetermined temperature greater than zero degrees centigrade; calculate on the basis of the read start temperature a second warm-up period required to defrost ice inside the pump using the heater; set a start time for warm-up of the pump using the heater on the basis of a difference between the first warm-up period and the second warm-up period; and control the heater to begin generating heat at the start time for warm-up of the pump.

The details as well as other features and advantages of this invention are set forth in the remainder of the specification and are shown in the accompanying drawings.

DESCRIPTION OF THE PREFERRED EMBODIMENTS

Figure 1:
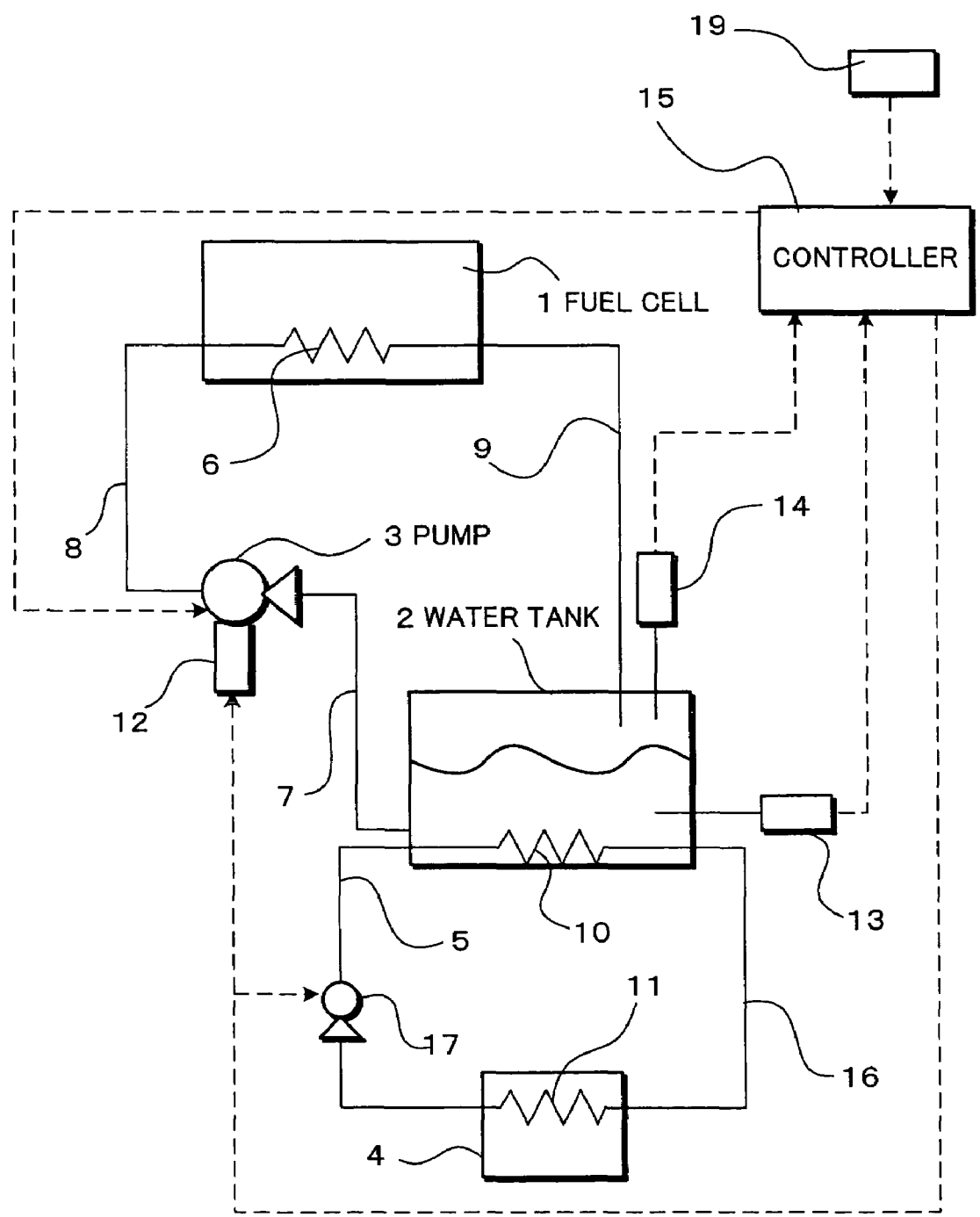
FIG. 1 is a schematic diagram of a fuel cell system of this invention.

Referring to FIG. 1, a fuel cell system of this invention comprises a fuel cell 1, a pure water tank 2, a pump 3, a heater 12, a heat exchanger 4, a water temperature sensor 13, a temperature sensor 14, and a controller 15.

The fuel cell 1 generates power by means of a reaction between hydrogen and oxygen, and supplies this power to the outside. The pure water tank 2 stores the pure water (water for humidifying oxygen gas or hydrogen gas) required for the reaction in the fuel cell 1. The pump 3 conveys pure water from the pure water tank 2 to the fuel cell 1, and circulates the pure water between the fuel cell 1 and the pure water tank 2. The heater 12 heats the pump 3 in order to defrost ice inside the pump 3 below freezing point. The heater 12 is preferably an electric heater. The heat exchanger 4 heats a heating medium for performing heat exchange with the pure water inside the pure water tank 2. The water temperature sensor 13 and temperature sensor 14 detect the temperature of the pure water tank. The controller 15 receives signals from the water temperature sensor 13 and temperature sensor 14, and controls the heater 12 in accordance with the temperature of the pure water tank 2.

The fuel cell 1 comprises a pure water supply portion 6 having a water permeable membrane which supplies the pure water required to advance the hydrogen-oxygen reaction to the fuel cell 1. The pure water also functions as cooling water. The pure water is fed from the pure water tank 2 by the pump 3, passes through passages 7, 8, and is thus conveyed to the pure water supply portion 6. A part of the pure water is supplied to the fuel cell 1 by the pure water supply portion 6, whereupon the remaining pure water passes through a passage 9 and returns to the pure water tank 2.

A pure water heating portion 10 is provided in the pure water tank 2 as a heating device which warms the pure water inside the tank upon start-up of the fuel cell. When the pure water is frozen, the heating medium heated by the heat exchanger 4 is circulated through the pure water heating portion 10 so as to defrost the frozen water. The frozen water may be defrosted using an electric heater as the heating device for warming the pure water inside the tank.

Figure 6A:
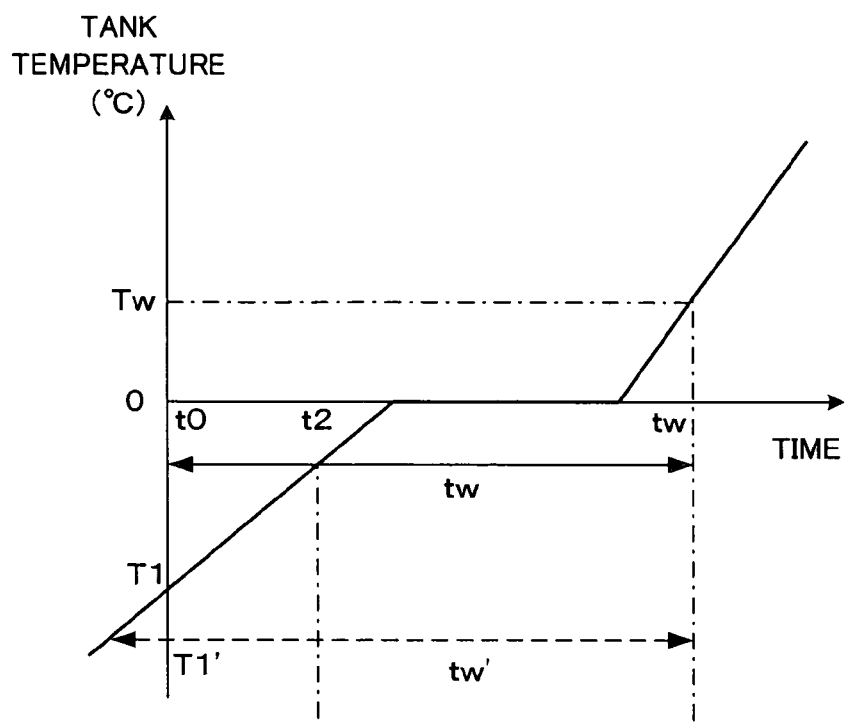
FIG. 6A is a map illustrating time variation in the temperature inside a pure water tank.

The water temperature sensor 13 submerged in the pure water measures the water temperature inside the pure water tank 2 directly in the pure water tank 2. The temperature sensor 14 measures the temperature inside the pure water tank 2 (in particular, the air temperature directly above the pure water in the pure water tank 2). Since the temperature sensor 14 is not submerged in the pure water, the water temperature is measured by the temperature sensor 14 indirectly. When the pure water is frozen, the water temperature sensor 13 may malfunction, and hence at or below freezing point, the water temperature is preferably measured indirectly using the temperature sensor 14. As shown in FIG. 6A, the temperature of the pure water tank 2, detected by the temperature sensor 14, is raised by the heat generated in the pure water heating portion 10.

A heat exchange passage 11 is provided in the heat exchanger 4. The heat exchange passage 11 performs heat exchange with high temperature gas that is generated by and recovered from a device, not shown in the drawing, inside the fuel cell system, and thus warms the heating medium inside the heat exchange passage 11. The heat exchange passage 11 is connected to the pure water heating portion 10 via passages 5, 16. A pump 17 circulates the heating medium through the passages.

The pump 3 is provided on the outside of the pure water tank 2, and supplies pure water from the pure water tank 2 to the fuel cell 1. A heater 12 is attached to the pump 3 to defrost ice in the interior of the pump 3 when the pump 3 freezes.

Figure 2:
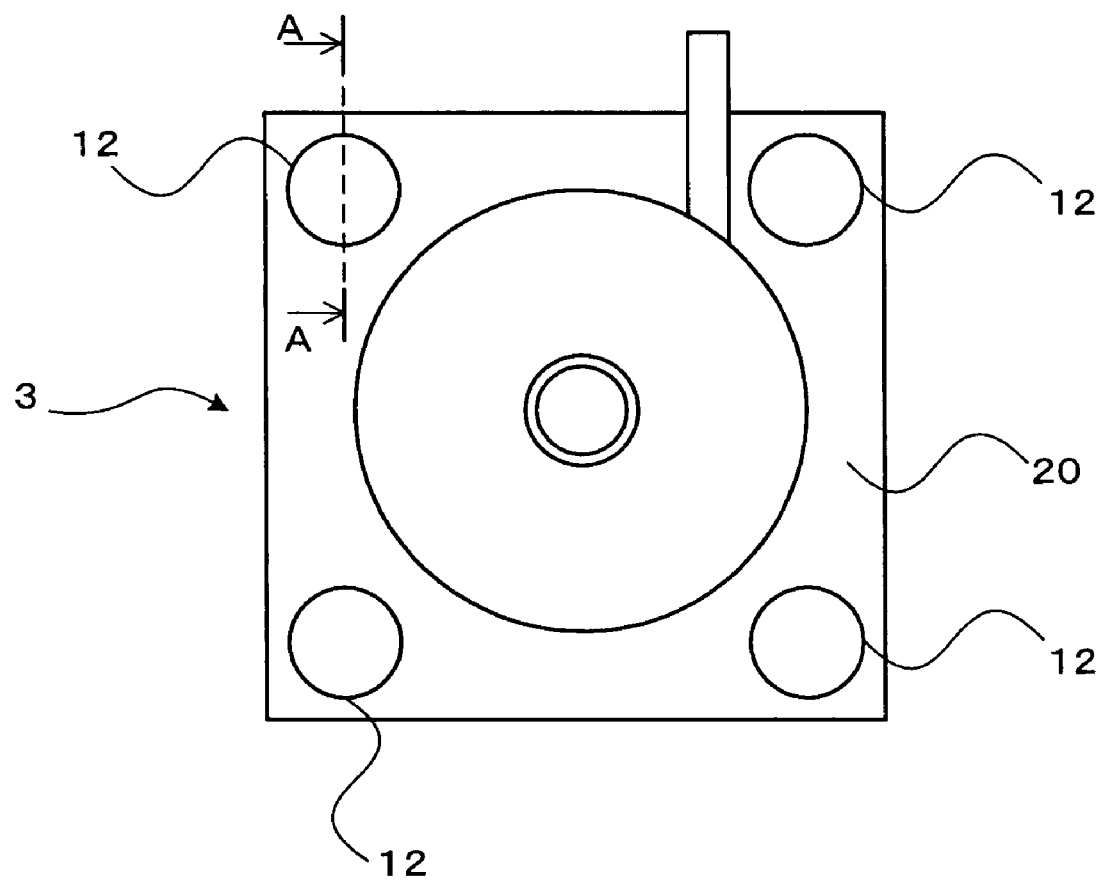
FIG. 2 is a front view of a pump.
Figure 3:
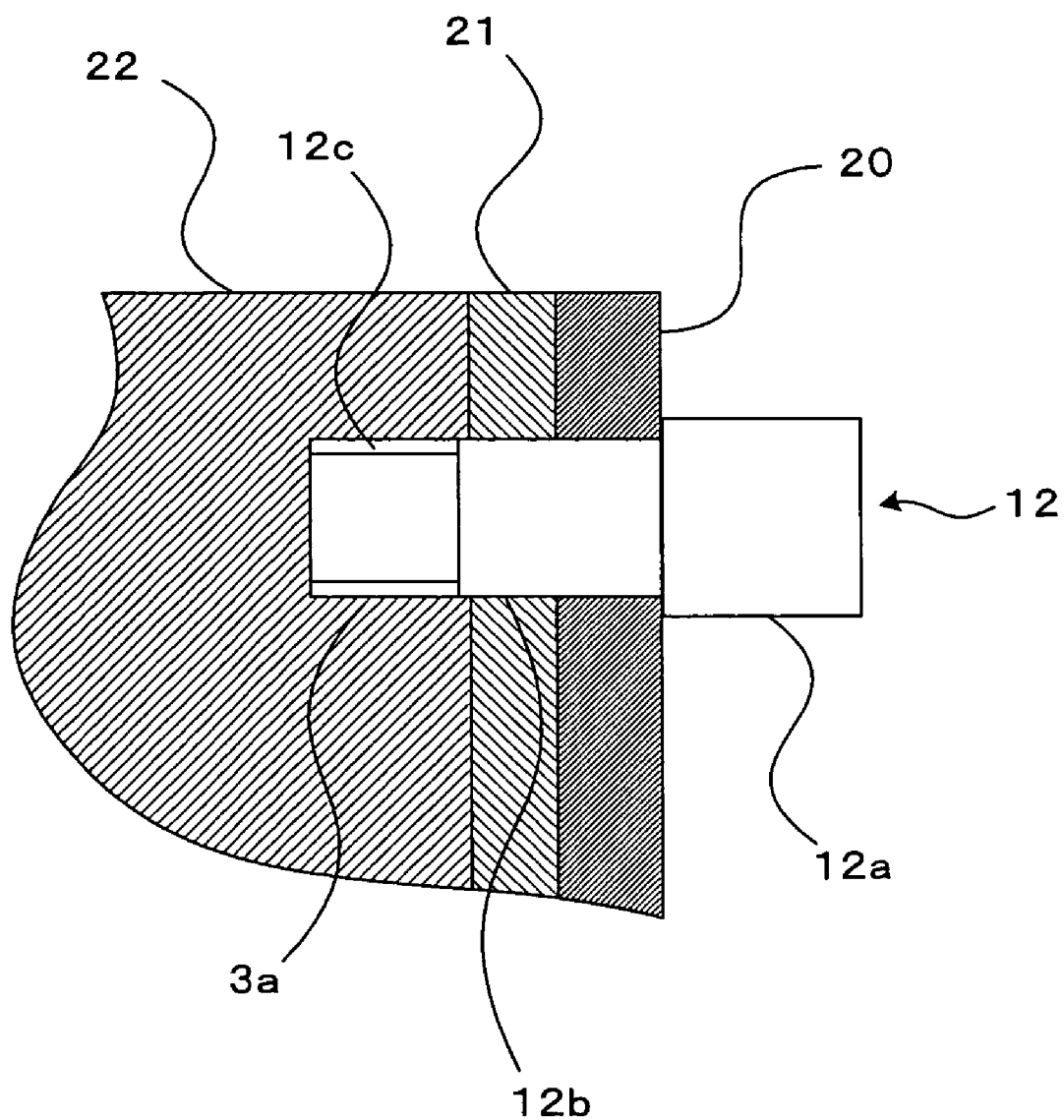
FIG. 3 is a sectional view of the pump along an A-A line of the pump in FIG. 2.

Referring to FIGS. 2, 3, the pump 3 and heater 12 will be described.

Four heaters 12 are attached to a front casing 20 of the pump 3 in four locations. The heater 12 is rod-shaped, and the longitudinal direction thereof is substantially parallel to the axial direction of the pump. Referring to FIG. 3, the heater 12 comprises a cylindrical head portion 12a and a core portion 12b which is coaxial with the head portion 12a and has a smaller diameter than the head portion 12a. A male screw 12c is cut into a part of the outer periphery of the core portion 12b.

The pump 3 is an electrical motor pump, but not limited to this. The pump 3 is assembled by sandwiching a pump case 21 on both sides by a rear casing 22 and the front casing 20 (front cover). The rear casing 22 accommodates a cylindrical stator 41 of an electrical motor and the pump case 21 accommodates a cylindrical rotor 43 of the electrical motor rotor as shown in FIG. 4A. A female screw 3a is cut into the rear casing 22. The pump case 21 and front casing 20 each comprise a hole, which is coaxial with the female screw 3a of the rear casing 22, through which the heater 12 passes. The heater 12 is inserted from the front casing 20 side. The male screw 12c of the heater 12, which is screwed into the female screw 3a, fixes the rear casing 22, pump case 21, and front casing 20 together tightly.

Thus the heat transfer coefficient of the pump 3 improves, and accumulations of frozen pure water inside the front casing 20 and rear casing 22, which cause freezing of the pump 3, can be defrosted swiftly. Moreover, heat is generated by the entire heater 12, and hence the front casing 20 and rear casing 22 can be warmed simultaneously even when the pump case 21 is formed from a thermal insulating material such as resin.

Figure 4:
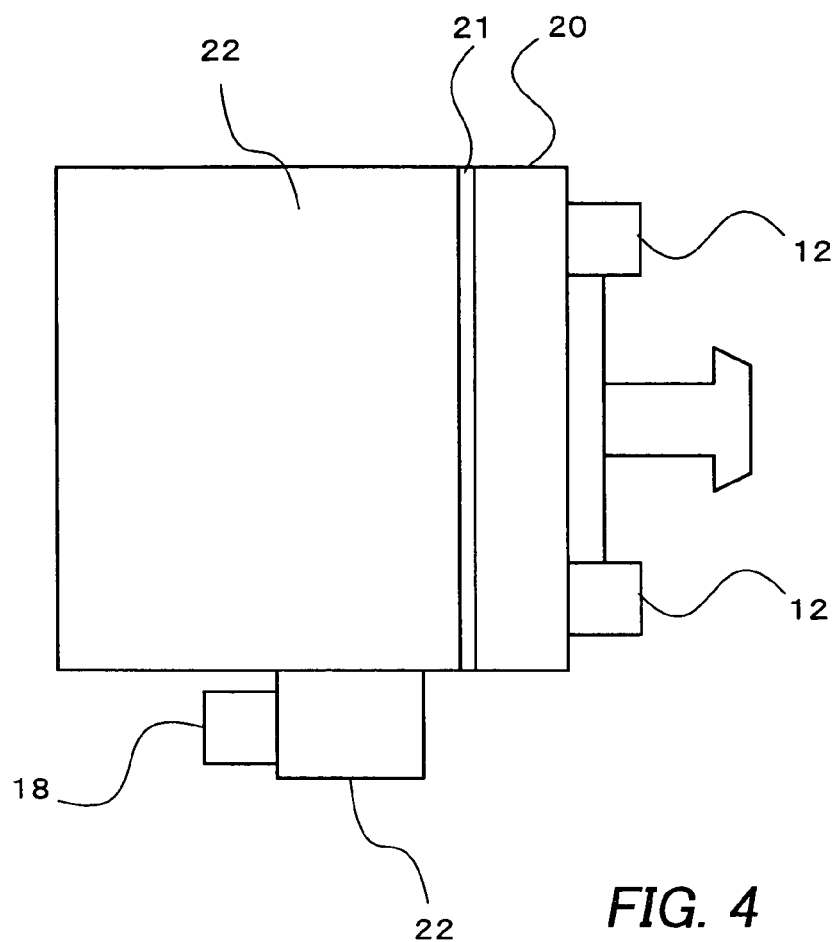
FIG. 4 is a side view of a pump.
Figure 4A:
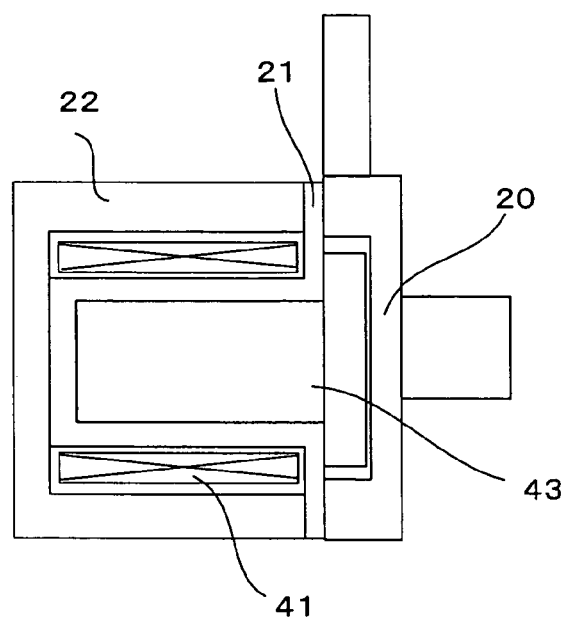
FIG. 4A is a cross sectional view of a pump along pump axis.

Referring to FIG. 4, the pump 3 may comprise a heater 18 in addition to the heater 12. At least one heater 18 is provided on the rear casing 22 of the pump 3. In so doing, frozen pure water in the pump 3 can be defrosted even more swiftly.

The controller 15 performs control of the heater 12 and pump 3 in accordance with the water temperature inside the pure water tank 2, detected by the water temperature sensor 13, and the temperature of the pure water tank 2, detected by the temperature sensor 14.

The controller 15 is a microcomputer-based controller. The controller 15 is constituted by a microcomputer comprising a central processing unit (CPU) which executes programs, read-only memory (ROM) which stores programs and data, random access memory (RAM) which stores calculation results of the CPU and obtained data temporarily, a timer which measures time, and an input/output interface (I/O interface).

Figure 5:
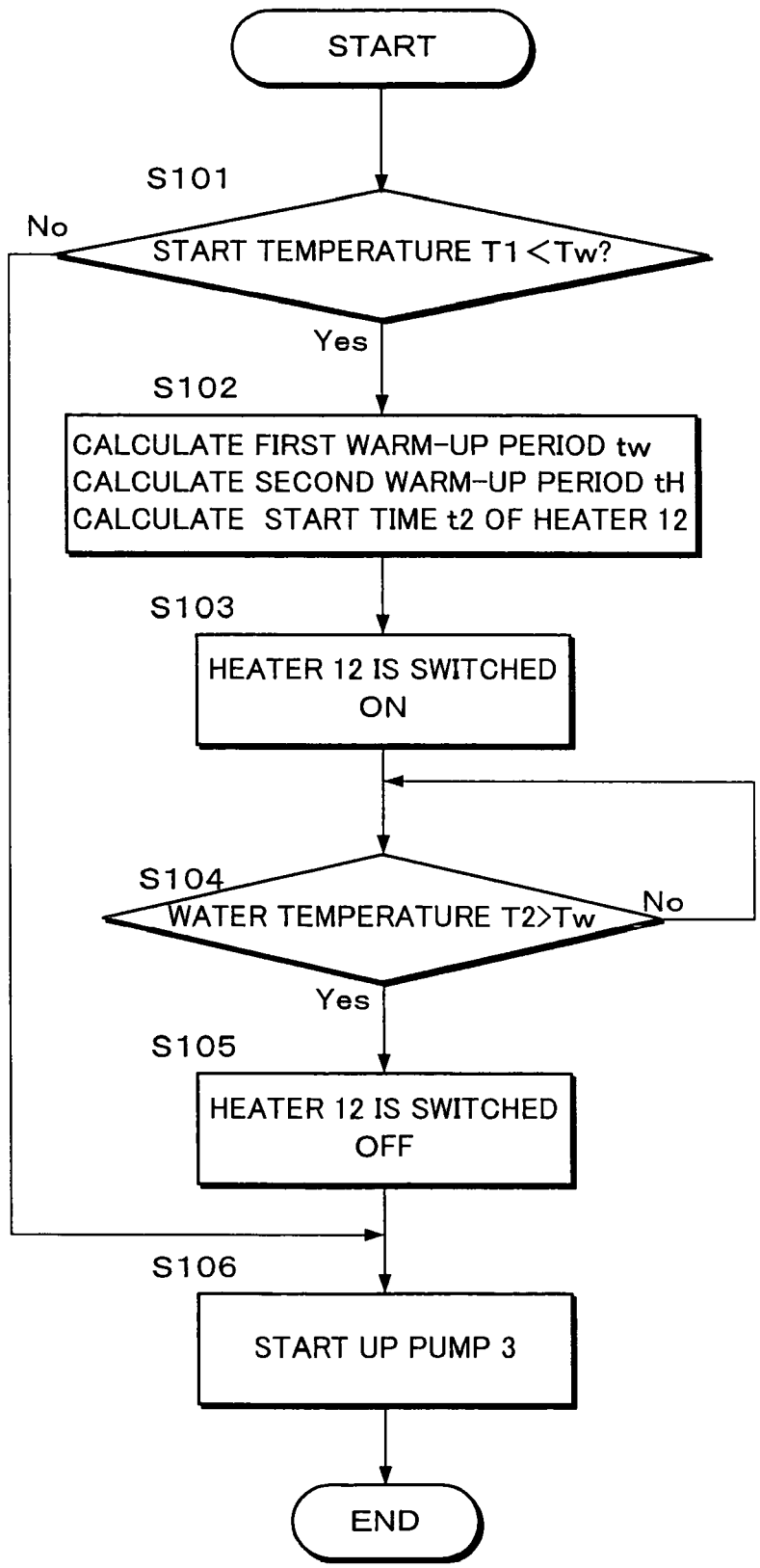
FIG. 5 is a flowchart illustrating control executed by a controller.

Next, referring to the flowchart in FIG. 5, an activation control routine (program) executed by the controller 15 will be described.

When a start switch 19 is switched ON by an operator, the controller 15 receives a start signal from the start switch 19, and hence may begin the control routine. Further, when the start switch 19 is switched ON, the controller 15 starts up the pump 17 such that warm-up of the pure water tank 2 is begun by the pure water heating portion 10.

Figure 5A:
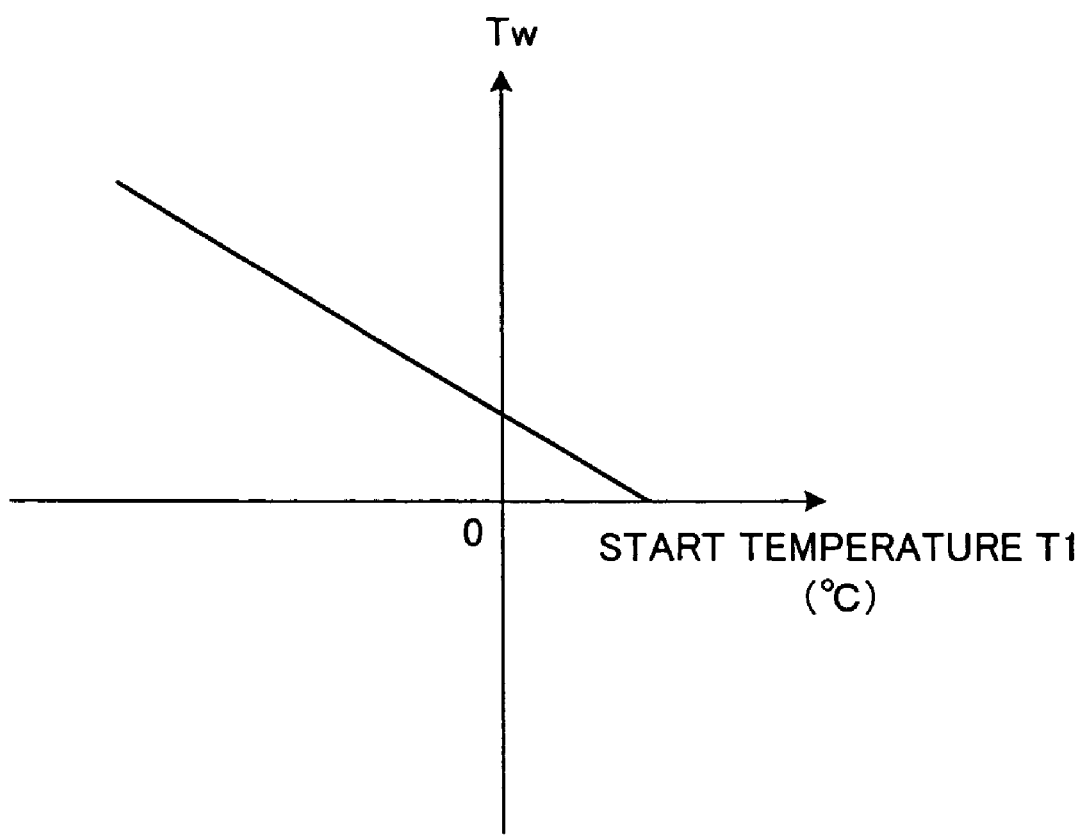
FIG. 5A is a map for defining a relation between a predetermined temperature Tw and a start temperature T1.

In a step S101, a start temperature T1 of the pure water tank 2 is read as a start temperature of the fuel cell system by the temperature sensor 14, and a determination is made as to whether or not the start temperature T1 is lower than a predetermined temperature Tw. The predetermined temperature Tw is set to be slightly higher than zero degrees centigrade. The predetermined temperature Tw may be set, with reference to a map, to decrease according to the start temperature T1 as shown in FIG. 5A. Since warm-up of the pure water tank 2 begins at the time of the step S101, the start temperature T1 of the pure water tank 2 is substantially equal to the outside air temperature and the start temperature of the pump 3. When the start temperature T1 (or outside air temperature) is lower than the predetermined temperature Tw, there is a possibility that the pump 3 is frozen, and also that pure water has frozen inside the pump 3 and passages 7-9. When T1 is equal to or higher than Tw (T1≧Tw), it is determined that the pump 3 is defrosted and that pure water supplied from the pure water tank 2 has not frozen inside the pump 3 and passages 7-9, and hence the routine advances to a step S106.

Also in the step S101, the current time is set as an activation operation start time t0. Normally, the time t0 is preferably set to zero.

In the step S106, a pump switch is switched ON, and the pump 3 is started up. Thus pure water from the pure water tank 2 is supplied to the fuel cell 1.

When T1 is lower than Tw (T1<Tw), it is determined that the pump 3 is frozen and that pure water supplied from the pure water tank 2 has frozen inside the pump 3 and passages 7-9, and hence the routine advances to a step S102.

In the step S102, a time period tw (first warm-up period) required for the pure water inside the pure water tank 2 to reach the predetermined temperature Tw is calculated on the basis of the start temperature T1 of the pure water tank 2, detected in the step S101, by referring to the map in FIG. 6A. The map in FIG. 6A shows time variation in the temperature inside the pure water tank.

Figure 7:
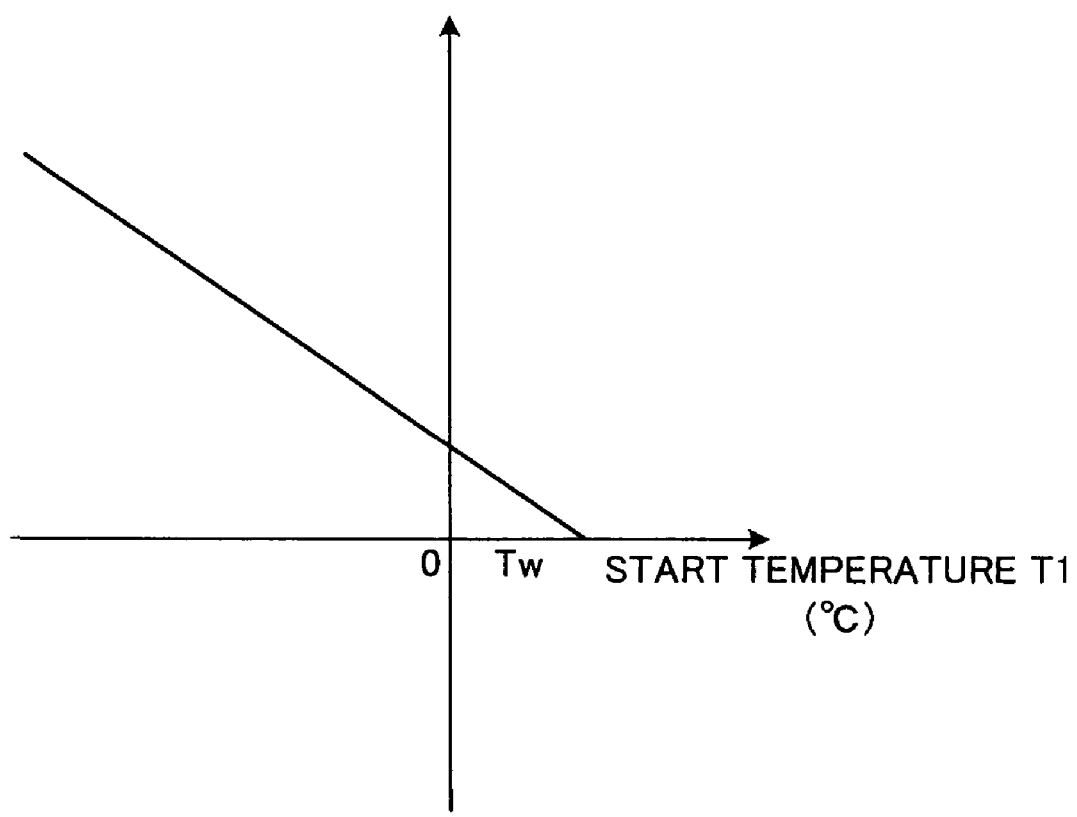
FIG. 7 is a map determining the relationship between a time period (tH) required for defrosting ice inside the pump using the heater, and a start temperature (T1) of the fuel cell system at the beginning of defrosting.

Further, in the step S102, a time period tH (second warm-up period) required to defrost the ice inside the pump 3 using the heater 12 is determined on the basis of the detected start temperature T1 by referring to the map in FIG. 7. The map in FIG. 7 determines the relationship between the second warm-up period tH and the start temperature T1 of the pure water tank 2 (i.e. the outside air temperature). The start temperature T1 of the pure water tank 2 is substantially equal to a pump start temperature Tps at the beginning of pump defrosting, and hence the start temperature T1 of the pure water tank 2 can be used to determine the time period tH required to defrost the ice inside the pump using the heater. Finally in the step S102, a start time t2 for warm-up of the pump 3 using the heater 12 is set on the basis of the difference Dt between the first warm-up period tw and the second warm-up period tH. The start time t2 is the sum of the activation operation start time t0 (the time at which the start temperature T1 is read in the step S101) and the difference Dt between the time period tH and the time period tw (t2=t0+Dt=t0+tw−tH).

When T1=0° C., the time period tw cannot be determined univocally from the start temperature T1 in the map in FIG. 6A, and hence the start time t2 for warm-up of the pump 3 may be set to t0 without calculating the time period tw and the time period tH (Dt=0). In other words, the heater 12 may be switched ON simultaneously with the start of the activation operation.

The maps in FIGS. 6A and 7 are determined in advance by experiment, and may be stored in the ROM of the controller 15. The warm-up period tw of the pure water tank 2 increases as the start temperature T1 falls. For example, referring to FIG. 6A, a lower start temperature T1' results in a longer warm-up period tw'. The warm-up period tH of the pump 3 also increases as the start temperature T1 falls.

If the output of the heater 12 is small, the pure water inside the pure water tank 2 reaches the predetermined temperature Tw before warm-up of the pump 3 is complete. Hence the amount of heat generated by the heater 12 is set to be large enough such that the warm-up period tH of the pump 3 is shorter than the warm-up period tw of the pure water tank 2.

In a step S103, the routine waits until the start time t2, and then, at the start time t2, the heater 12 is controlled to begin heat generation (the heater 12 is switched ON). Thus the heater 12 generates heat at a fixed calorific value (or a declared power). The fixed calorific value is determined in advance in consideration of the heat capacity and so on of the pump 3. Thus warm-up of the pump 3 is begun, and thereafter, the routine advances to a step S104.

In the step S104, a water temperature T2 inside the pure water tank 2 is read from the water temperature sensor 13, and a determination is made as to whether or not the water temperature T2 is higher than the predetermined temperature Tw. When the water temperature T2 is higher than Tw (T2≧Tw), it is determined that the ice inside the pump 3 is defrosted, and that the pure water in the passages has ceased to freeze during the supply of pure water to the fuel cell 1. Hence the routine advances to a step S105. When the water temperature T2 is lower than Tw (T2<Tw), the step S104 is repeated.

For the sake of accuracy, the water temperature T2 is measured and read directly in the step S104. However, the water temperature T2 may be read indirectly from the temperature sensor 14 instead of being read from the water temperature sensor 13. In other words, a temperature (T1") which is read from the temperature sensor 14 at the current time may be used in place of the water temperature T2.

In the step S105, the heater 12 is controlled to stop generating heat (the heater 12 is switched OFF) because the ice inside the pump 3 is defrosted.

The routine then advances to the step S106, where the pump 3 is started up. Hence supply of the pure water inside the pure water tank 2 to the fuel cell 1 commences.

Figure 6B:
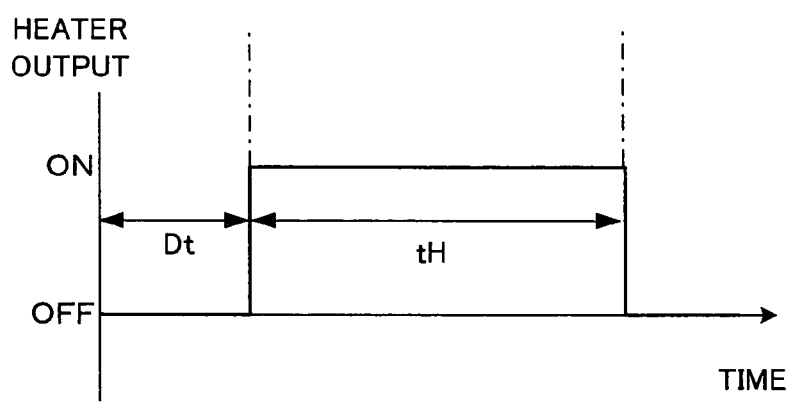
FIG. 6B is a time chart illustrating time variation in the calorific value of a heater (when the heater is switched ON and OFF).

Referring to the time chart in FIG. 6B, an operation of the heater 12 will be described.

At the time t0, the fuel cell or fuel cell system of this invention begins an activation operation (or a start-up operation). At this time, the temperature of the pure water tank 2 is the start temperature T1. On the basis of the start temperature T1, the time period tw required for the temperature of the pure water tank 2 to reach the predetermined temperature Tw is calculated. At or above the predetermined temperature Tw, the pure water in the pure water tank 2 is defrosted, and hence pure water can be supplied to the fuel cell 1. The time t2 at which the switch of the heater 12 is switched ON is determined on the basis of the time period tH required for the heater 12 to complete defrosting of the ice inside the pump 3.

Figure 6C:
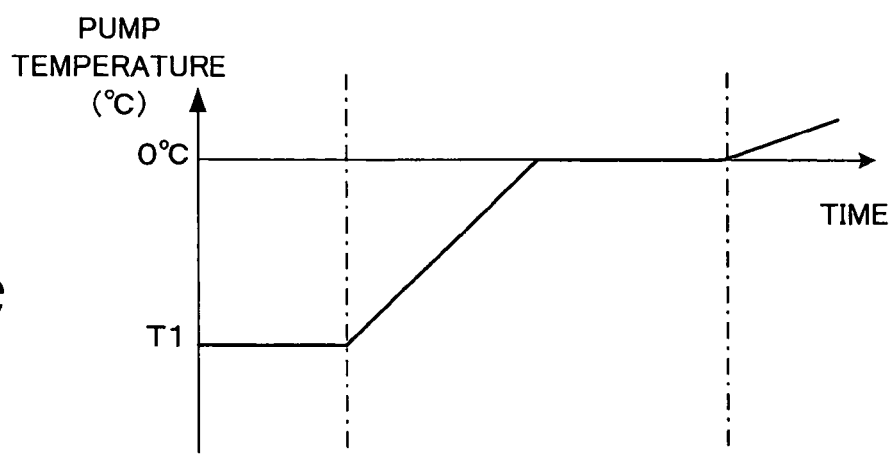
FIG. 6C is a graph showing schematically the state of temperature increase in the pump 3.

At the time t2, the switch of the heater 12 is switched ON, and warm-up of the pump 3 begins. The temperature Tp of the pump 3 rises as shown in FIG. 6C. Hence the ice inside the pump 3 begins to defrost.

When the time period tw has elapsed and the water temperature of the pure water tank 2 has reached Tw, the switch of the heater 12 is switched OFF, and the switch of the pump 3 is switched ON. Henceforth, the pump 3 begins to supply pure water from the pure water tank 2 to the fuel cell 1.

Next, effects of the embodiment of this invention will be described.

The pump 3 for conveying pure water from the pure water tank 2 to the fuel cell 1 is provided between the fuel cell 1 and the pure water tank 2. Thus the size of the pure water tank 2 can be reduced, and the design freedom of the fuel cell system can be increased.

When the fuel cell is activated below freezing point, the operating period tH of the heater 12 (warm-up period of the pump 3) required to defrost the ice inside the pump 3 is calculated on the basis of the start temperature T1 of the pure water tank 2. From the operating period tH, the warm-up start time t2 of the heater 12 is determined, and hence the heater 12 is able to defrost the ice inside the pump 3 with the minimum power consumption.

The water temperature of the pure water tank 2 is detected by the water temperature sensor 13 in the pure water tank 2, and when the water temperature reaches a predetermined temperature, warm-up ends. Hence freezing of the pure water inside the passages can be prevented accurately.

In the pump 3, the pump case 21 is sandwiched between the front casing 20 and the rear casing 22, whereupon the pump case 21, front casing 20, and rear casing 22 are fixed together tightly. Hence in the pump 3, the heat of the heater 12 is transferred efficiently. By providing a heater 18 on the rear casing 22 in addition to the heater 12, the large-volume rear casing 22 can be warmed more quickly.

In the above embodiment, the pure water tank 2 is preferably provided with the temperature sensor 14 which measures the start temperature of the pure water tank 2 as representative of the start temperature of the fuel cell system. However, a component other than the pure water tank 2 (for example pump 3) may be provided with the temperature sensor 14 to measure the start temperature of the fuel cell system.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

The entire contents of Japanese Patent Application P2003-202488 (filed Jul. 28, 2003) are incorporated herein by reference.

What is claimed is:

1. A start-up control device for a fuel cell system provided with a fuel cell which performs power generation using hydrogen and oxygen, a water tank which stores water to be supplied to the fuel cell, and a heating device which defrosts the water inside the tank during activation of the fuel cell, the control device comprising:

- signal means for signaling activation of the fuel cell;
- detecting means for detecting a temperature inside the water tank;
- pump means for conveying water from the water tank to the fuel cell;
- heating means for warming the pump means; and
- reading means for reading a start temperature from said detecting means upon reception of a signal from signal means;
- first calculating means for calculating on the basis of the read start temperature a first warm-up period required for the water inside the water tank to reach a predetermined temperature greater than zero degrees centigrade;
- second calculating means for calculating on the basis of the read start temperature a second warm-up period required to defrost ice inside the pump means using the heating means;
- setting means for setting a start time for warm-up of the pump means using the heating means on the basis of a difference between the first warm-up period and the second warm-up period; and
- control means for controlling the heating means to begin generating heat at the start time for warm-up of the pump means.

2. The start-up control device as defined in claim 1, wherein the setting means sets the start time for warm-up of the pump means which is retarded from a time at which the control means further receives the signal from the signal means by the difference between the first warm-up period and the second warm-up period.

3. The start-up control device as defined in claim 1, wherein the first calculating means comprises a first map which illustrates time variation in the temperature inside the water tank and the first calculating means calculates the first warm-up period by referring to the first map, and wherein the second calculating means comprises a second map which determines a relationship between the second warm-up period and the start temperature and the second calculating means calculates the second warm-up period by referring to the second map.

4. The start-up control device as defined in claim 1, wherein the control means is further programmed to:

- read a water tank temperature from at least one detecting means for detecting a temperature after the heating means has begun to generate heat;
- determine whether or not the read water tank temperature is higher than the predetermined temperature; and
- control the heating means to stop generating heat when the read water tank temperature is higher than the predetermined temperature.

5. The start-up control device as defined in claim 4, wherein the control means is further programmed to start up the pump means after controlling the heating means to stop generating heat.

6. The start-up control device as defined in claim 1, wherein the control means is further programmed to:

- determine whether or not the start temperature read upon reception of the signal from the signal means is lower than the predetermined temperature;
- start up the pump means when the start temperature is equal to or higher than the predetermined temperature; and
- start up the pump means after the heating means has generated heat when the start temperature is lower than the predetermined temperature.

7. The start-up control device as defined in claim 1, wherein the pump means comprises a front casing, a rear casing, and a pump case sandwiched therebetween, the rear casing is provided with a female screw, a part of the outer periphery of the heating means is provided with a male screw, and the front casing and the rear casing are joined by screwing the male screw into the female screw.

8. The start-up control device as defined in claim 7, wherein the pump means comprises another heating means on the rear casing.

9. The start-up control device as defined in claim 1, wherein at least one detecting means for detecting a temperature includes a temperature sensor submerged in the water inside the water tank to directly detect a water temperature, and a temperature sensor not submerged in the water inside the water tank.

10. A start-up control method for a fuel cell system, the fuel cell system being provided with a fuel cell which performs power generation using hydrogen and oxygen, a water tank which stores water to be supplied to the fuel cell, a heating device which defrosts the water inside the tank during activation of the fuel cell, a switch which signals activation of the fuel cell, at least one temperature sensor which detects a temperature inside the water tank, a pump which conveys water from the water tank to the fuel cell, and a heater which warms the pump, the start-up control method comprising the steps of:

- reading a start temperature from said at least one temperature sensor upon reception of a signal from the switch;
- calculating on the basis of the read start temperature a first warm-up period required for the water inside the water tank to reach a predetermined temperature greater than zero degrees centigrade;
- calculating on the basis of the read start temperature a second warm-up period required to defrost ice inside the pump using the heater;
- setting a start time for warm-up of the pump using the heater on the basis of a difference between the first warm-up period and the second warm-up period; and
- controlling the heater to begin generating heat at the start time for warm-up of the pump.

* * * * *